July 9, 1935.  E. L. LINDER  2,007,766
COMBINATION BRAKE AND CLUTCH FOR AIRPLANE MOTORS AND THE LIKE
Filed May 8, 1933
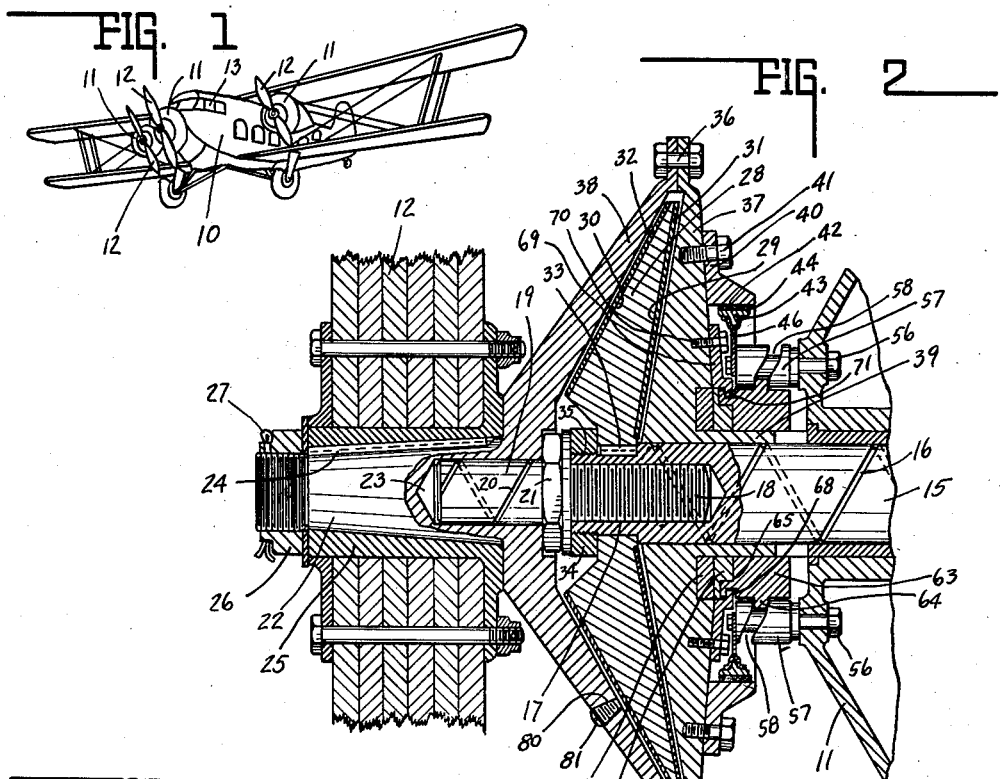
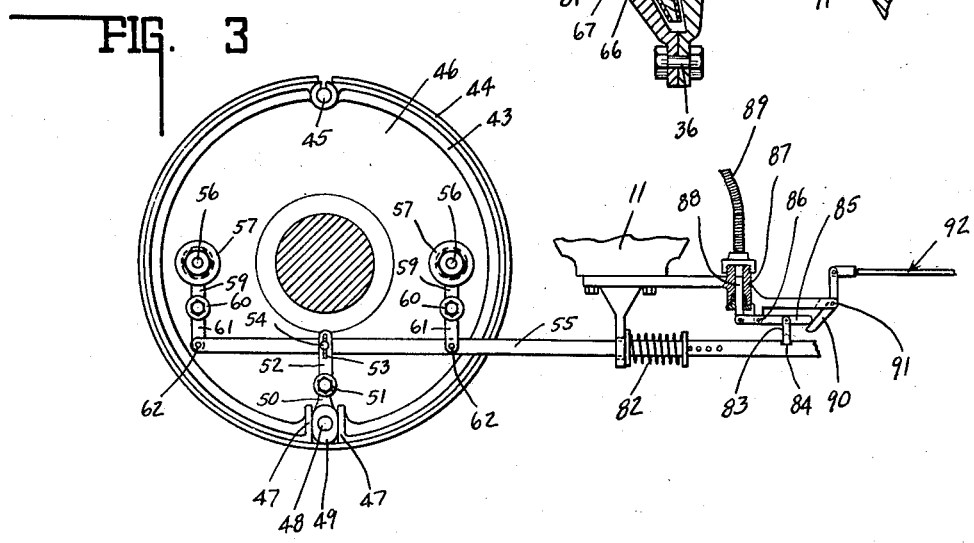
INVENTOR.
EDWIN L. LINDER.
BY
Lockwood Lockwood Goldsmith & Galt
ATTORNEYS.

Patented July 9, 1935

2,007,766

UNITED STATES PATENT OFFICE 2,007,766

COMBINATION BRAKE AND CLUTCH FOR AIRPLANE MOTORS AND THE LIKE

Edwin L. Linder, Carthage, Ind., assignor of one-third to George W. Offutt, Arlington, Ind., and one-third to Aloysius J. Carr, Carthage, Ind.

Application May 8, 1933, Serial No. 669,909

6 Claims. (Cl. 192—147)

This invention relates to a combination brake and clutch construction.

This invention is peculiarly adaptable to the connection between the propeller and the power shaft of an engine, which propeller and engine constitute one of a plurality of odd numbered engines embodied in a self propelled vehicle such as an airplane and wherein the purpose of the invention in this application is to control either the engine or the hub of the propeller if the latter should break or both, and the invention is applied to the opposed and balancing engine so that it could also be operated to balance the motive power applied to the vehicle.

The chief feature of the invention consists in a dual clutch construction combined with a brake structure.

Another feature of the invention consists in the enclosed arrangement of the clutch construction.

Another feature of the invention consists in the multiple positioned control for selectively operating the combined clutch and brake for clutching and/or braking purposes.

Another feature of the invention consists in the specific form of clutch operating mechanism.

Another feature of the invention consists in the provision of means whereby upon an overspeeding of the motor, fluid pressure operable means responsive thereto, automatically releases a lock upon the control which is normally constrained toward braking position but held by said lock in neutral position.

The full nature of the invention will be understood from the accompanying drawing and the following description and claims:—

In the drawing, Fig. 1 is a perspective view of a tri-motor airplane, each of the motors being equipped with the invention.

Fig. 2 is a central sectional view on an enlarged scale of the combination clutch and brake structure interposed between the crank shaft and propeller, rotatable by the engine.

Fig. 3 is an end view of a part of the brake structure and the control for selectively operating the clutch and brake structures, said control including an automatic release and lock for a purpose hereinafter set forth.

In the drawing, 10 indicates an airplane provided with three motors 11, each of which is provided with a propeller shaft 12. The invention is embodied between the propeller and the engine and includes a dual clutch construction combined with a brake structure and the control to said combination structure and from each of these engines extends to the pilot's cabin indicated at 13 for selective control by the pilot. Whenever one propeller becomes damaged or disintegrates, the control mechanism is actuated to prevent the motor from "running away", and to hold the hub against rotation. Also, in such a case, the control for the opposed and balancing engine would be similarly actuated so that there would be no unbalanced driving force applied to the airplane.

In Fig. 2 the numeral 11 indicates a portion of the engine, or the engine support as the case may be. Projecting therefrom, is the crank shaft or shaft which drives the propeller and is driven by the engine if a gear reduction system is employed, and said shaft is indicated by the numeral 15, and includes the oil channel 16. The forward end of said shaft 15 is recessed and interiorly threaded as at 17 and receives the threaded end 18 of a shaft extension member having the projecting portion 19 provided with oil feed grooves 20. The shaft 18—19 includes the tool engageable portion 21.

A spindle 22 is recessed as at 23 to receive the projecting end 19 of the extension shaft. The spindle 22 is keyed as at 24 to a propeller hub structure 25 retained on the spindle by the nut 26 and the cotter key 27. The hub 25 supports the propeller 12 as shown in Fig. 2.

Adjacent the forward end of the shaft 15 and surrounding a reduced portion thereof is a clutch disc 28 having two inclined faces 29 and 30, respectively, and each is provided with a clutch facing 31 and 32 respectively. The disc is keyed as at 33 to the shaft 15 and the nut 34, which is threadedly mounted upon the threaded end 35 of the shaft 15, retains the clutch disc in rigid connection with the shaft and the key insures rotation of the disc with the shaft.

Completely enclosing said disc is a pair of clutch shells, clutch shell 37 being arranged for cooperation with the disc facing 29 and clutch shell 38 being arranged for cooperation with the disc facing 30, the two discs being peripherally secured together in any suitable manner as indicated at 36. Clutch shell 38 is herein shown integral with the spindle 22 and clutch shell 37 is herein shown rotatably mounted upon the shaft 15 and includes a rearwardly directed collar portion 39. The collar 39 and shell 37 are not only rotatably mounted on the shaft 15 but are axially slidable thereon.

A ring type pieces 40 is suitably secured as at 41 to the shell 37 and provides an annular face 42 that constitutes a brake drum surface. A shoe 43 having the lining 44 is mounted within the same and adapted to be moved into engagement with the brake drum 42.

The brake shoe 43—see Fig. 3—is formed of two substantially semi-circular segments and two adjacent ends of the segments are pivotally supported at 45 upon a head bolt carried by the plate 46. The opposite adjacent ends are provided with two faces 47 and mounted upon the pivot 48 also carried by plate 46 is a cam 49 which is adapted upon rotation of the cam in either direction to expand the shoes so that the lining thereof will engage the drum. An arm 50 is rigid with the cam and terminates in an adjustable connection 51, one portion of which is carried by the end of an arm 52 containing the slot 53 associated with which is a pin 54 carried by a control rod 55.

Supported by the plate 46 and by the engine portion 11 are a plurality of stationary shafts in the form of bolts 56 and mounted on each is a cylindrical element 57 having an inclined peripheral slot 58 therein. Rigid with each cylindrical element is an arm 59 that terminates in an adjustable connection 60 and another arm extension 61 also has a cooperating adjusting portion in the connection 60. Each arm 61 is connected at 62 to the rod 55. Plate 46 is stationary with respect to the engine since plate 46 is carried by the cylinder supports or bolts 56.

A collar or control ring 63 includes a peripheral portion 64 seatable in the cam groove 58 in the several cylindrical members 57. The ring 63 is rotatably mounted upon sleeve portion 39 and thus is rotatable as well as axially slidable relative to shaft 15 and by movement of member 55—see Fig. 3—through the adjustable (at 60) rigid connections 59—61 rotating cylindrical elements 57.

The control ring is under cut as at 65 and interposed between the same and the shell 37 are the bearing members 66 and 67, member 66 having a portion extending into the undercutting. The control ring 63 also is provided with an external groove 68 and a ring 69, suitably secured as at 70 to the clutch shell 37, has an offset portion 71 seatable in the groove 68. There is no interference between plate 46 and collar 63 or ring 69 or the projection 71 thereof, relative to rotary or axial movement of the latter mentioned parts. By means of the aforesaid, it is evident that the collar or control ring 63 is axially rigid with the shell although it may be rotatable relative thereto.

It will also be apparent that as the cylindrical cams are rotated, the inclination of the cam groove will cause the collar to be moved axially along the shaft 15 and by reason of the aforesaid connection, the entire shell structure will be moved along the shaft in the direction toward the propeller end or toward the opposite end. When collar 63 is moved axially it either causes faces 32 and 33 or faces 27 and 31 to engage, or when intermediately positioned, member 28 rides free from both faces 31 and 32.

The aforesaid adjustable connections 51 and 60 are provided respectively for brake adjustment and for clutch adjustment, and the single control rod 55, it will be obvious, is adapted to selectively control the braking and clutching actions of the combination structure.

Inasmuch as the clutch construction is formed as an enclosed unit with respect to the shells, it will be obvious that the clutch disc may rotate in the chamber provided in the shells and the latter may contain a liquid, the supply therefor being applied through the opening 80 closed by the plug 81.

The aforesaid mechanism enables the pilot to disengage the propeller from the motor while running, holding the propeller stationary with the brake.

In a tri-motored plane should either of the outboard motors fail, it causes a drag making the airplane more difficult to control and this also uses more fuel. By disengaging the propeller from the engine, this drag will be eliminated, the airplane will be easier to control and the additional fuel ordinarily required under these operating conditions will be saved.

This mechanism also has the advantage that during the "warming-up" period for the engines prior to the take-off, the propeller may be disconnected from the engine and thus the engine can run free from the propeller and be warmed up and the draft created by the propeller during the warming up period will be eliminated.

As a safety factor should the propeller explode or break, means may be associated with the combination clutch and brake which would actuate the rod 55 automatically to disengage the propeller from the engine or apply the brake to the propeller supporting parts and with one pair of clutch faces engaged, this would also put a braking force upon the engine, holding the engine from any burst of over-speeding and thereby preventing the possibility of the engine being torn from the plane by reason of such over-speeding.

It will be observed that the foregoing mechanism is capable of triple action, to wit, it is arranged to connect the engine and the propeller for direct drive without any braking force applied to either. It is arranged to permit free running of the propeller whenever the engine normally connected thereto is not running and it serves as an emergency connection and will apply a braking action to the propeller hub and associated parts and the motor to prevent the motor from "running away".

It is to be observed that the connection between the propeller and the driving shaft 15 may be obtained through either clutch shell and the clutch disc and by reason thereof one of said clutch connections is arranged to be operative when the brake is actuated and one when the brake is not.

Control 55 thus has several control positions. In one, only one clutch and the brake are operative; in another, both clutches are inoperative and the brake only is operative, and in another only the other clutch is operative. This desired action or operation is readily obtained through the several adjustments provided at 51 and 60— see Fig. 3.

Associated with rod 55 is a spring structure 82 normally tending to constrain the rod into brake applying position. Also associated with the rod is a lock or latch tooth 83 seatable in notch 84 in the rod 55. Tooth 83 is carried by lever 85 pivoted at 86 in housing 87 suitably supported adjacent the rod 55. A plunger 88 or equivalent structure, such as a diaphragm, is responsive to fluid pressure in flexible conduit 89. As the motor overspeeds in warming up or when the propeller breaks, the oil in the shells may be caused to exert pressure upon the plunger to tilt lever 85 to release rod 55 from tooth 83, and then spring 82 automatically moves rod 55 to apply the brake 43—44 to drum 42. The connection between conduit 89 and the mechanism illustrated in Fig. 2, is not illustrated. Instead of the pressure responsive arrangement described, a speed responsive engine driven pump may be utilized to apply pressure to member 88 upon the engine exceeding the predetermined speed. For manually releasing latch 83, a lever 90 pivoted at 91 is provided, whereby when movement is given to rod 92, lever 90 will lift arm 85 disengaging latch 83 from notch 84 allowing rod 55 to function and apply the brake or control the clutch manually.

The invention claimed is:—

1. The combination with a driving shaft, and a propeller including a hub, a clutch shell secured to the hub, of a clutch member therein secured to the shaft, and means for axially moving the shell and hub for selective connection to and disconnection from shaft, said shell and member being arranged for clutching engagement at the two limits of axial movement, and being disassociated at an intermediate position therebetween.

2. In combination, a rotatable shaft, a clutch member carried thereby, another clutch member rotatably associated therewith, a brake member carried thereby, another brake member cooperating therewith, a pair of said clutch and brake members being axially movable relative to shaft and the other brake and clutch members, and means for selectively associating the brake members and the clutch members or neutrally positioning the same for non-braking and non-driving to permit engine idling.

3. The combinaton with a rotatable shaft, of a clutch member carried thereby, another clutch member rotatably associated therewith, a brake member carried thereby, another brake member cooperating therewith, a pair of said clutch and brake members being axially movable relative to shaft and the other brake and clutch members, a control member pivotally mounted and axially slidable and operatively associated with associated slidable members, complementary cam means cooperating with the control member for axial movement of the associated slidable members, and a single means for selectively tilting the control member for slidable movement and associating the brake members together for braking.

4. The combination with a motor and a propeller to be driven thereby, of a brake construction therefor, a manually operable means for controlling the construction, an engine speed responsive latch, and means operatively associated therewith and the manually operable means for automatically actuating the same upon the motor attaining a predetermined speed and to brake the engine.

5. The combination with a motor and a propeller to be driven thereby, of a unitary clutch and brake construction interposed therebetween, manually operable means for selectively controlling said construction, an engine speed responsive latch, and means operatively associated therewith and the manually operable means for automatically actuating the same upon the motor attaining a predetermined speed and to brake the engine.

6. The combination with a driving shaft and a propeller rotatable relative thereto and, adapted for rotation thereby, of dual clutch constructions interposed between said shaft and said propeller, a brake construction operatively associated with one of the clutch constructions, and a single means for selectively engaging one of the clutch constructions for driving the propeller by said shaft, secondly, for disengaging one of said clutch constructions and the brake for rotation of the shaft without rotation of the propeller, and thirdly, for connection of a clutch construction for connecting the propeller to the shaft for driving and simultaneously operating the brake construction for braking both propeller and shaft.

EDWIN L. LINDER.